(12) United States Patent
Lin

(10) Patent No.: US 6,975,840 B2
(45) Date of Patent: Dec. 13, 2005

(54) CHARGE PUMP FOR AN INTEGRATED CIRCUIT RECEIVER

(75) Inventor: Tsung-Hsien Lin, Los Angeles, CA (US)

(73) Assignee: Broadcom Corporation, Irvine, CA (US)

( * ) Notice: Subject to any disclaimer, the term of this patent is extended or adjusted under 35 U.S.C. 154(b) by 261 days.

(21) Appl. No.: 10/159,365

(22) Filed: May 31, 2002

(65) Prior Publication Data

US 2003/0224736 A1 Dec. 4, 2003

(51) Int. Cl.[7] .............................................. H04B 1/40
(52) U.S. Cl. ........................ 455/76; 455/86; 455/259; 327/157; 331/17
(58) Field of Search .......................... 455/76, 86, 259, 455/260, 265; 327/157, 536; 331/17

(56) References Cited

U.S. PATENT DOCUMENTS 6,421,530 B1 * 7/2002 Adachi et al. ................ 455/86
6,531,913 B1 * 3/2003 Ross ........................... 327/536

* cited by examiner

Primary Examiner—Lee Nguyen
(74) Attorney, Agent, or Firm—Garlick Harrison & Markison, LLP; James A. Harrison

(57) ABSTRACT

A radio transceiver includes a charge pump formed within a local oscillator that adjusts a voltage input to a voltage-controlled oscillator in a manner that flattens a response curve for small changes in voltage due to a variety of effects including channel length modulation. Thus, a local oscillation tends to provide a greater degree of stability. More specifically, the charge pump of the transceiver includes a pair of feedback circuits that source an additional amount of current into a filter to slightly increase a voltage input to the voltage-controlled oscillator in response to small upward changes in output voltage levels (input with respect to the voltage-controlled oscillator). Similarly, when the output voltage level drops slightly, a second feedback circuit causes a small amount of current to be sinked from the output node thereby slightly decreasing the input voltage to the voltage-controlled oscillator. Thus, the inventive charge pump produces better matching between IUP and IDOWN thus operating to produce a response curve that tends to be flatter in response to small voltage changes due to circuit conditions.

33 Claims, 11 Drawing Sheets

CHARGE PUMP FOR AN INTEGRATED CIRCUIT RECEIVER

BACKGROUND

1. Field of the Invention

This invention relates generally to wireless communications and, more particularly, to the operation of a Radio Frequency (RF) transceiver within a component of a wireless communication system.

2. Description of the Related Art

The structure and operation of wireless communication systems are generally known. Examples of such wireless communication systems include cellular systems and wireless local area networks, among others. Equipment that is deployed in these communication systems is typically built to support standardized operations, i.e., operating standards. These operating standards prescribe particular carrier frequencies, modulation types, baud rates, physical layer frame structures, Medium Access Control (MAC) layer operations, link layer operations, etc. By complying with these operating standards, equipment interoperability is achieved.

In a cellular system, a regulatory body typically licenses a frequency spectrum for a corresponding geographic area (service area) that is used by a licensed system operator to provide wireless service within the service area. Based upon the licensed spectrum and the operating standards employed for the service area, the system operator deploys a plurality of carrier frequencies (channels) within the frequency spectrum that support the subscriber units within the service area. Typically, these channels are equally spaced across the licensed spectrum. The separation between adjacent carriers is defined by the operating standards and is selected to maximize the capacity supported within the licensed spectrum without excessive interference. In most cases, severe limitations are placed upon the amount of adjacent channel interference that may be caused by transmissions on a particular channel.

In cellular systems, a plurality of base stations is distributed across the service area. Each base station services wireless communications within a respective cell. Each cell may be further subdivided into a plurality of sectors. In many cellular systems, e.g., Global System for Mobile Communications (GSM) cellular systems, each base station supports forward link communications (from the base station to subscriber units) on a first set of carrier frequencies, and reverse link communications (from subscriber units to the base station) on a second set of carrier frequencies. The first set and second set of carrier frequencies supported by the base station are a subset of all of the carriers within the licensed frequency spectrum. In most, if not all, cellular systems, carrier frequencies are reused so that interference between base stations using the same carrier frequencies is minimized and system capacity is increased. Typically, base stations using the same carrier frequencies are geographically separated so that minimal interference results.

Both base stations and subscriber units include RF transceivers. Radio frequency transceivers service the wireless links between the base stations and subscriber units. The RF transmitter receives a baseband signal from a baseband processor, converts the baseband signal to an RF signal, and couples the RF signal to an antenna for transmission. In most RF transmitters, because of well-known limitations, the baseband signal is first converted to an Intermediate Frequency (IF) signal and then the IF signal is converted to the RF signal. Similarly, the RF receiver receives an RF signal, down converts it to IF and then to baseband. In other systems, the received RF is converted directly to baseband.

In down converting a signal (either an IF or RF signal) to a baseband frequency signal, the signal is mixed with a reference signal having a specified frequency that is received from a local oscillator (LO). As used herein, "local oscillator" is a device that provides a fixed frequency to a mixer that is to be mixed with a signal of interest, e.g., RF signal or IF signal. Because the mixer's ability to accurately down convert (or up convert for a transmitter stage) a signal depends upon it receiving an accurate frequency signal from the local oscillator, many local oscillators are formed to be adjustable so as to adjust an output frequency to a number of supported RF channels and to account for variations due to temperature, process, manufacturing and other factors that may affect the precise frequency that is produced by the local oscillator.

The reference signal used by the mixer is often provided by a phase-locked loop that includes a charge pump (circuit for sinking or sourcing a current), a loop filter (a low pass filter) and a voltage-controlled oscillator (to provide a signal with frequency that is a function of an input voltage level). A function of the charge pump is to source current into or sink current out of a loop filter that is coupled between the charge pump and the voltage-controlled oscillator of the phase-locked loop system. Typical charge pump designs include a current sink and a current source that are selectively coupled to an output of the charge pump so that, based upon appropriate control signals, current may be sinked or sourced as necessary to lower or increase a voltage applied to the voltage-controlled oscillator. Known charge pump designs do not, however, provide for current sinking or sourcing in a precise manner, especially when the charge pump requires very little adjustment for providing a desired amount of current to a loop filter and, therefore, voltage to an input of a voltage-controlled oscillator (VCO).

What is needed is a charge pump that provides more precise current sinking and sourcing from/to a loop filter and VCO.

SUMMARY OF THE INVENTION

In order to overcome the shortcomings described above, a local oscillator (LO) includes a charge pump that sinks current from a loop filter or sources current into the loop filter responsive to changes in a charge pump output signal level. The LO outputs a reference signal having a signal with a specified frequency characteristic. More specifically, the output reference signal can be produced by a voltage-controlled oscillator (VCO) coupled within a phase-locked loop. A phase-locked loop typically comprises a phase frequency detector, a charge pump, a loop filter, a VCO and a frequency divider in a closed loop to automatically control the frequency of the VCO.

The phase detector provides an UP or DOWN signal to the charge pump based on the phase difference between the VCO frequency and a reference frequency. The charge pump injects or removes current from a loop filter to increase or decrease the control voltage thereby increasing or decreasing the VCO frequency. As the VCO frequency converges on the desired frequency, the charge pump uses a voltage feedback path to dynamically control both the UP and DOWN currents (IUP and IDOWN) to minimize the mismatch between IUP and IDOWN. The charge pump further includes discharge circuitry to cancel charge injection that results when a switching MOSFET is turned off.

More specifically, circuitry ("IUP circuitry") for generating a source current ("IUP") is provided, in addition to circuitry ("IDOWN circuitry") that is for sinking a current ("IDOWN"). Under ideal operating conditions where a voltage input to a VCO is equal to a specified value, IUP is equal to IDOWN. Accordingly, all current generated by the IUP circuitry is sinked by the IDOWN circuitry. Unfortunately, however, device characteristics often result in a mismatch between IUP and IDOWN even though the two should be equal in magnitude.

Thus, the charge pump formed according to the present invention includes a feedback path and configuration of transistors that linearizes (flattens) a current response curve whenever the output voltage from the charge pump changes. By flattening the current response curve, the mismatch between IUP and IDOWN is decreased (IUP and IDOWN are better matched) thereby reducing uncontrolled changes to charge pump output currents and thereby reducing VCO output signal fluctuations. Additionally, the inventive charge pump includes discharge circuitry for discharging excess charge in output stage switching MOSFETs whenever the output stage switching MOSFETs are turned off responsive to phase frequency detector (PFD) control signals.

As one aspect of the present invention, the inventive system includes activating a first portion of the charge pump circuitry (IDOWN circuitry) that is for sinking current from the loop filter and activating a second portion of the charge pump circuitry (IUP circuitry) that is for sourcing current to the loop filter whenever a detected phase difference between a reference signal and a voltage-controlled oscillator output signal is too small for the PFD output signals to effectively control the source and sink currents and, therefore, the VCO output frequency. Accordingly, by turning on the sinking and the sourcing circuit portions whenever the phase difference is very small, the charge pump is better able to adjust an output frequency of a voltage-controlled oscillator to further fine tune its output and produce a more accurate output frequency.

Other aspects of the present invention will become apparent with further reference to the drawings and specification, which follow.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1A:
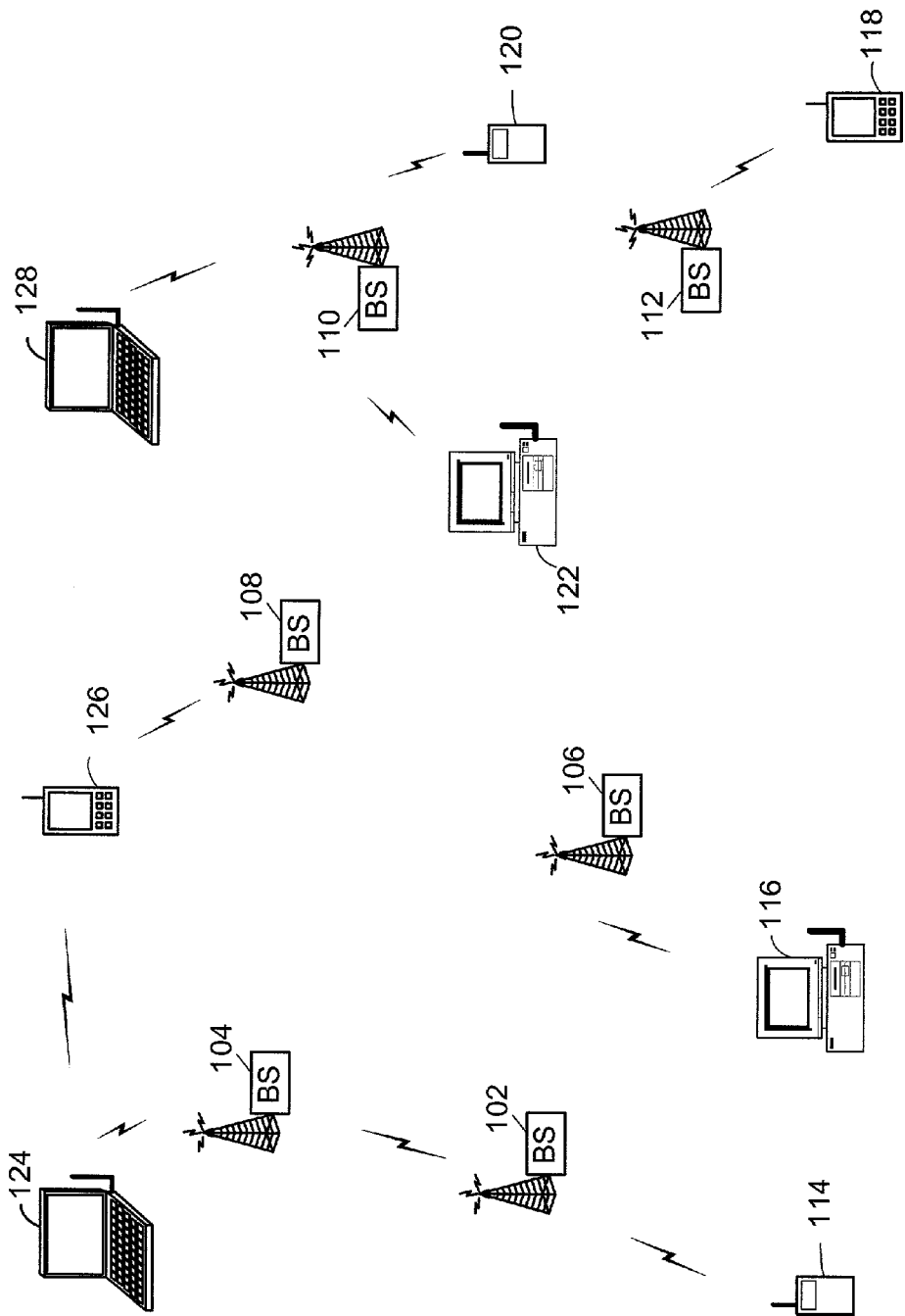
FIG. 1A is a system diagram illustrating a cellular system within which the present invention is deployed.

FIG. 1A is a system diagram illustrating a cellular system within which the present invention is deployed. The cellular system includes a plurality of base stations 102, 104, 106, 108, 110, and 112 that service wireless communications within respective cells or sectors. The cellular system services wireless communications for a plurality of wireless subscriber units. These wireless subscriber units include wireless handsets 114, 118, 120, and 126, mobile computers 124 and 128, and desktop computers 116 and 122. During normal operations, each of these wireless subscriber units communicates with one or more base stations during handoff among the base stations 102 through 112. Each of the wireless subscriber units 114 through 128 and base stations 102 through 112 include RF circuitry constructed according to the present invention.

The Bluetooth specification provides for a sophisticated transmission mode that ensures protection from interference and provides security of the communication signals. According to most designs that implement the Bluetooth specifications, the Bluetooth radio is being built into a small microchip and is designed to operate in frequency bands that are globally available. This ensures communication compatibility on a worldwide basis. Additionally, the Bluetooth specification defines two power levels.

Generally, Bluetooth facilitates the fabrication of a low-cost and low-power radio chip that includes some of these protocols described herein. The Bluetooth protocol operates in the unlicensed 2.4 GHz Industrial Scientific Medical (ISM) band and, more specifically, transmits and receives on 79 different hop frequencies at a frequency in the approximate range of 2400 to 2480 MHz, switching between one hop frequency to another in a pseudo-random sequence. Bluetooth, in particular, uses GFSK modulation. Its maximum data rate is approximately 721 kbits/s and the maximum range is up to 20–30 meters.

Even though Bluetooth has a much lower range and throughput than other known systems, its' consequently significantly reduced power consumption means it has the ability to be much more ubiquitous. It can be placed in printers, keyboards, and other peripheral devices, to replace short-range cables. It can also be placed in pagers, mobile phones, and temperature sensors to allow information download, monitoring and other devices equipped with a Bluetooth access point. Nonetheless, it is advantageous to improve the low power consumption of Bluetooth devices to improve battery life for portable applications.

Similarly, wireless LAN technologies (such as those formed to be compatible with IEEE 802.11b) are being designed to complement and/or replace the existing fixed-connection LANs. One reason for this is that the fixed connection LANs cannot always be implemented easily. For example, installing wire in historic buildings and old buildings with asbestos components makes the installation of LANs difficult. Moreover, the increasing mobility of the worker makes it difficult to implement hardwired systems. In response to these problems, the IEEE 802 Executive Committee established the 802.11 Working Group to create WLAN standards. The standards specify an operating frequency in the 2.4 GHz ISM band.

The first IEEE 802.11 WLAN standards provide for data rates of 1 and 2 Mbps. Subsequent standards have been designed to work with the existing 802.11 MAC layer, but at higher frequencies. IEEE 802.11a provides for a 5.2 GHz radio frequency while IEEE 802.11b provides for a 2.4 GHz radio frequency band (the same as Bluetooth). More specifically, the 802.11b protocol operates in the unlicensed 2.4 GHz ISM band. Data is transmitted on BPSK and QPSK constellations at 11 Mbps. 802.11b data rates include 11 Mbits/s, 5.5, 2 and 1 Mbits/s, depending on distance, noise and other factors. The range can be up to 100 m, depending on environmental conditions.

Because of the high throughput capability of 802.11b devices, a number of applications are more likely to be developed using 802.11b for networks such as that shown in FIG. 1A although the network of FIG. 1A may also be formed according to Bluetooth standards. These technologies will allow the user to connect to wired LANs in airports, shops, hotels, homes, and businesses in networks even though the user is not located at home or work. Once connected the user can access the Internet, send and receive email and, more generally, enjoy access to the same applications the user would attempt on a wired LAN. This shows the success in using wireless LANs to augment or even replace wired LANs.

The RF circuitry of the present invention is designed to satisfy at least some of the above mentioned standard-based protocols and may be formed in any of the wireless subscriber units 114 through 128, base stations 102 through 112 or in any other wireless device, whether operating in a cellular system or not. The RF circuitry of the present invention includes low power designs that utilize CMOS technology and that support the defined protocols in a more efficient manner. Thus, for example, the teachings of the present invention may be applied to wireless local area networks, two-way radios, satellite communication devices, or other devices that support wireless communications. One challenge with CMOS design in integrated circuits, however, is that they typically utilize voltage sources having low values (e.g., 3 volts) and are generally noisy. It is a challenge, therefore, to develop transceiver circuitry that have full functionality while meeting these lower power constraints and while providing good signal quality. The system of FIGS. 1A and 1B include the phase-locked loop with the inventive charge pump which accurately provides a desired frequency signal.

Figure 1B:
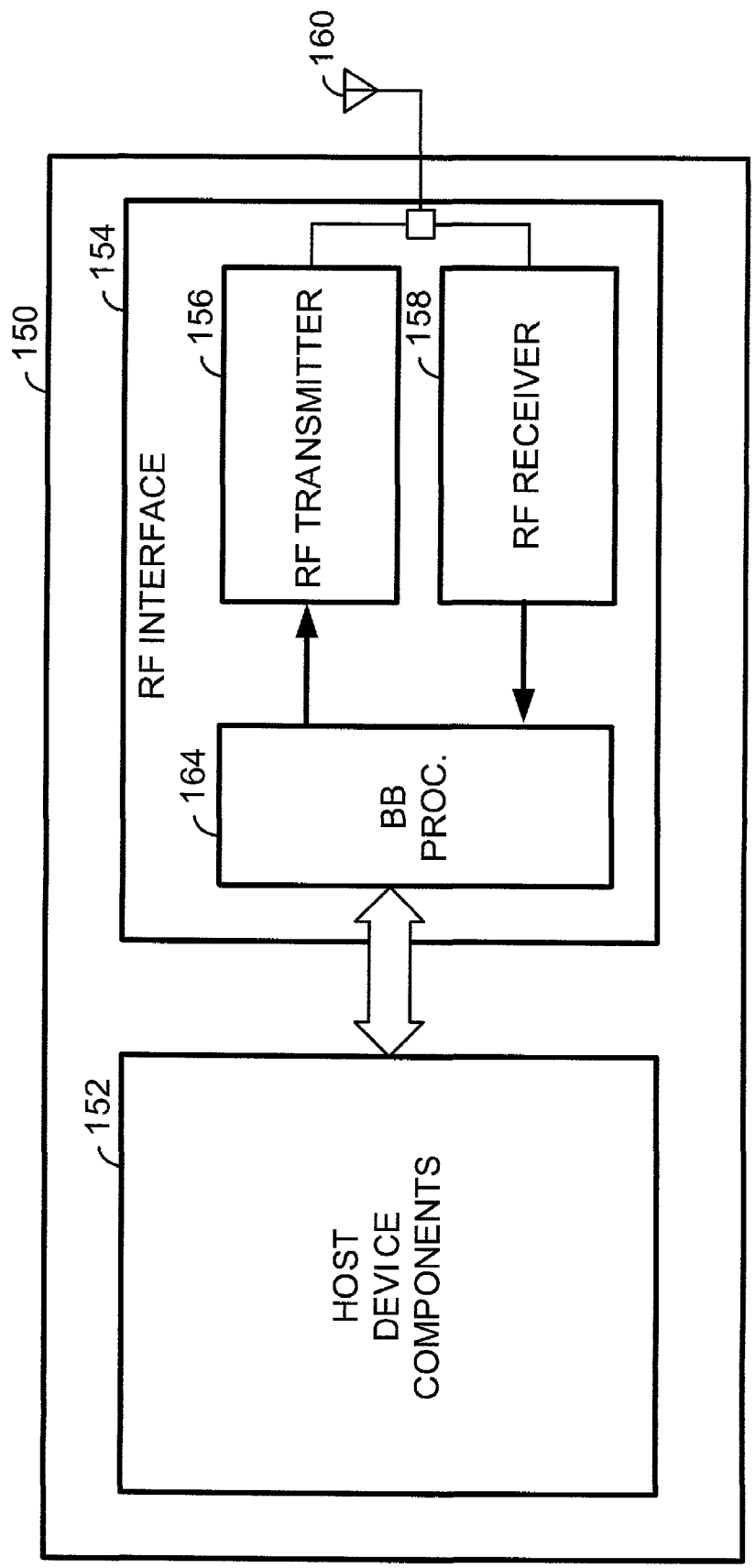
FIG. 1B is a block diagram generally illustrating the structure of a wireless device constructed according to the present invention.

FIG. 1B is a block diagram generally illustrating the structure of a wireless device 150 constructed according to the present invention. The general structure of wireless device 150 will be present in any of the wireless subscriber units 114 through 128 illustrated in FIG. 1A. Wireless device 150 includes a plurality of host device components 152 that service all requirements of wireless device 150 except for the RF requirements of wireless device 150. Of course, operations relating to the RF communications of wireless device 150 will be partially performed by host device components 152.

Coupled to host device components 152 is a Radio Frequency (RF) interface 154. RF interface 154 services the RF communications of wireless device 150 and includes an RF transmitter 156 and an RF receiver 158. RF transmitter 156 and RF receiver 158 both couple to an antenna 160 and to a baseband processor 164. One particular structure of a wireless device is described with reference to FIG. 2. The teachings of the present invention are embodied within RF interface 154. In general, the radio receiver of the present invention includes circuitry for receiving and processing constant modulation format RF signals. The radio receiver further includes charge pump circuitry formed according to the present invention so that the received signals may be accurately down converted or up converted. More specifically, the inventive circuitry includes dynamic current symmetry control and dummy switch circuitry that improves current matching between IUP and IDOWN and cancels charge injection thereby reducing VCO noise and instability.

Figure 2:
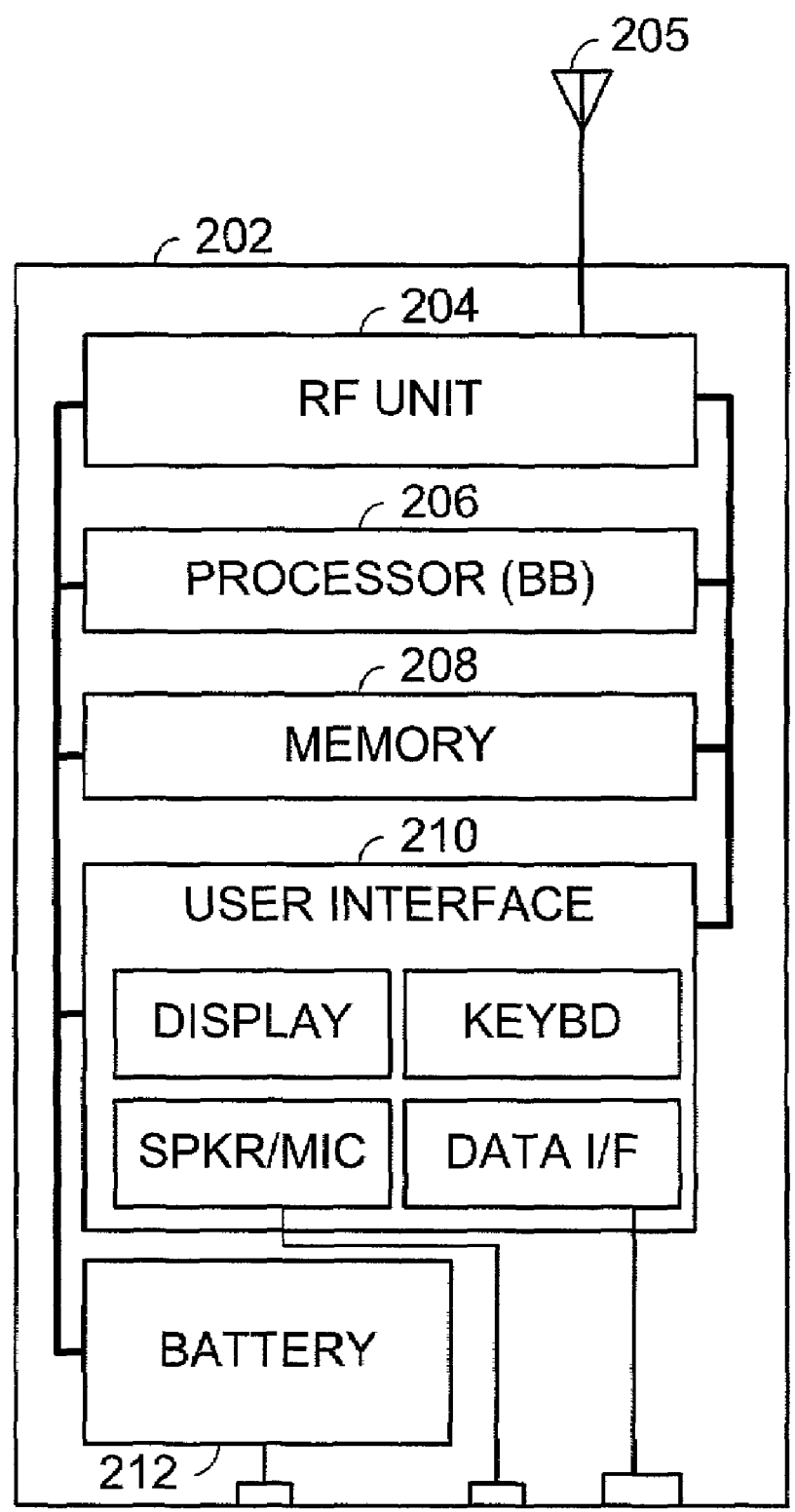
FIG. 2 is a block diagram illustrating a subscriber unit constructed according to the present invention.

FIG. 2 is a block diagram illustrating a subscriber unit 202 constructed according to the present invention. Subscriber unit 202 operates within a cellular system, such as the cellular system described with reference to FIG. 1A. Subscriber unit 202 includes an RF unit 204, a processor 206 that performs baseband processing and other processing operations, and a memory 208. RF unit 204 couples to an antenna 205 that may be located internal or external to the case of subscriber unit 202. Processor 206 may be an Application Specific Integrated Circuit (ASIC) or another type of processor that is capable of operating subscriber unit 202 according to the present invention. Memory 208 includes both static and dynamic components, e.g., Dynamic Random Access Memory (DRAM), Static Random Access Memory (SRAM), Read Only Memory (ROM), Electronically Erasable Programmable Read Only Memory (EEPROM), etc. In some embodiments, memory 208 may be partially or fully contained upon an ASIC that also includes processor 206. A user interface 210 includes a display, a keyboard, a speaker, a microphone, and a data interface, and may include other user interface components, as well. RF unit 204, processor 206, memory 208, and user interface 210 couple via one or more communication buses or links. A battery 212 is coupled to, and powers, RF unit 204, processor 206, memory 208, and user interface 210.

RF unit 204 includes the RF transceiver components and operates according to the present invention to adjust the frequency of a phase-locked loop in a manner that produces a signal with a specified frequency component. More specifically, RF unit 204 includes the phase-locked loop with the inventive charge pump as described herein that facilitates accurate frequency generation for a reference signal for use in transceiver operations by providing a degree of tuning or adjustment for a VCO input voltage to a level of precision not previously available. The structure of subscriber unit 202, as illustrated, is only one particular example of a subscriber unit structure. Many other varied subscriber unit structures could be operated according to the teachings of the present invention. Further, the principles of the present invention may be applied to base stations, as are generally described with reference to FIG. 1A.

Figure 3A:
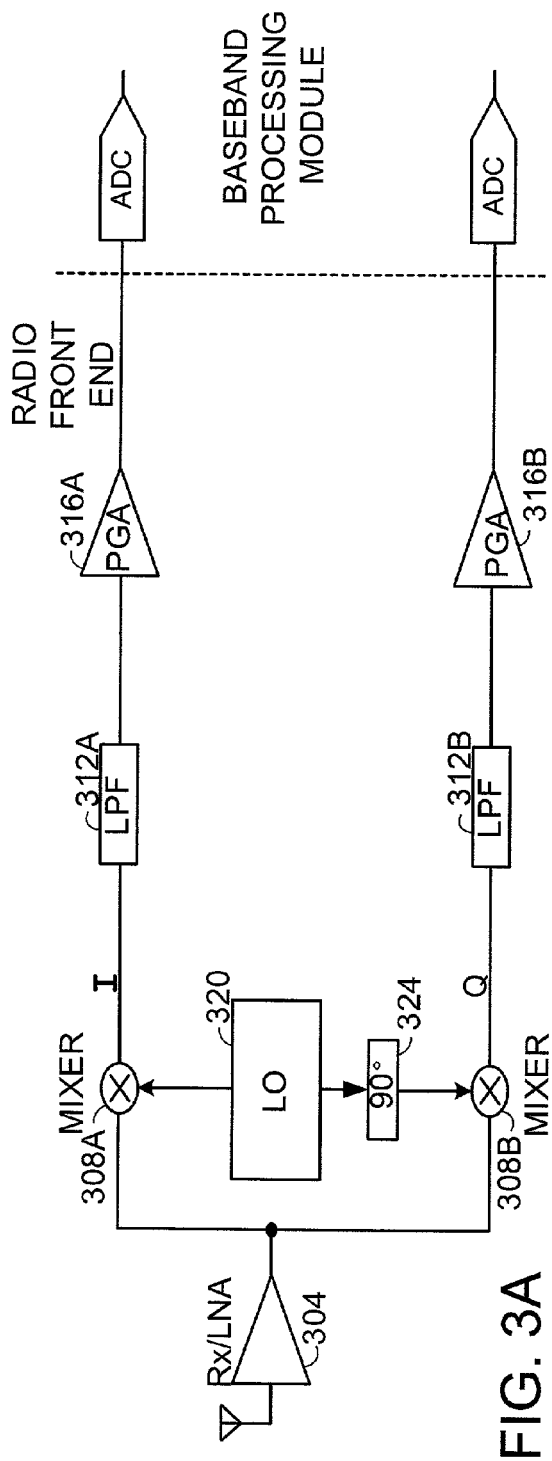
FIGS. 3A, 3B and 3C are functional schematic block diagrams of an RF processing unit of a radio transceiver (transmitter and receiver stages) and of a local oscillator with an inventive charge pump used within the transmitter and receiver stages, all according to one embodiment of the present invention.
Figure 3B:
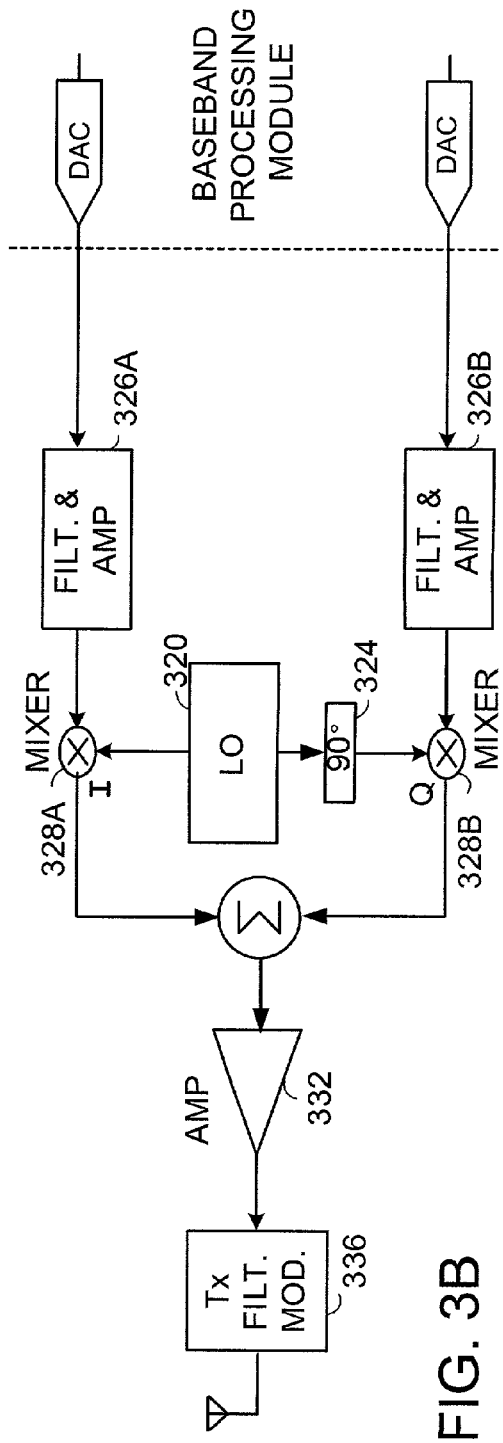
Figure 3C:
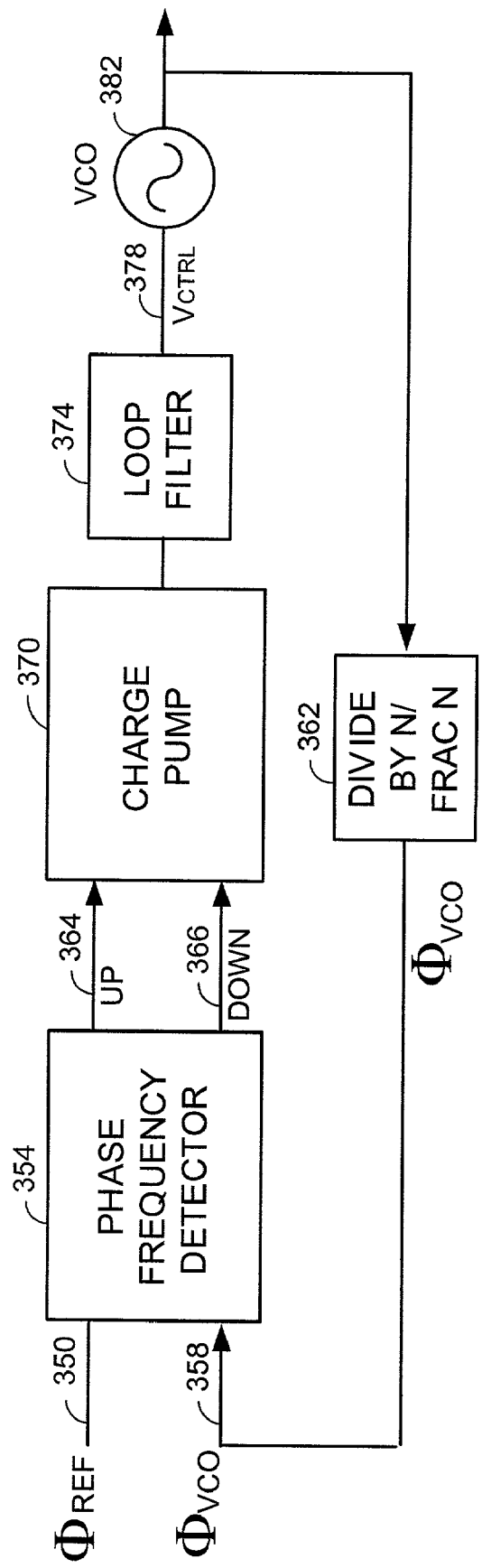

FIGS. 3A, 3B and 3C are functional schematic block diagrams of an RF processing unit of a radio transceiver (transmitter and receiver stages) and of a local oscillator with an inventive charge pump used within the transmitter and receiver stages, all according to one embodiment of the present invention. Referring now to FIG. 3A, an RF receiver unit includes a receiver/low noise amplifier (LNA) 304 that is coupled to receive wireless radio communications by way of an antenna. As is known by those of average skill in the art, radio communications typically employ one of many different modulation techniques, including Quadrature Phase Shift Keying (QPSK). Accordingly, receiver/LNA 304 produces an amplified signal to mixers 308A and 308B for separation into the I and Q modulated channels as is known by one of average skill in the art.

In the described embodiment of the invention, the radio transceiver is formed to satisfy 802.11b design requirements (although it could also be implemented to satisfy other network requirements, e.g. Bluetooth). Accordingly, the received RF input signal that is centered within one of a plurality of frequency channels in the 2.4 GHz range is down converted by mixers 308A and 308B. Thereafter, mixers 308A and 308B produce the down converted I and Q modulated channels to low pass filters 312A and 312B, respectively. The mixers 308A and 308B, more specifically, down convert the RF input signal to a low IF signal. As used herein, low IF specifically includes signals at baseband as well as at a low intermediate frequency if an intermediate frequency stage is used.

The mixers 308A and 308B both receive the RF signals with the I and Q modulated channels therein from receiver/LNA 304. Mixers 308A and 308B also receive a reference signal having a specified frequency component from local oscillator 320. Mixer 308B, as may be seen, receives the signal from local oscillator 320 by way of a phase shift circuit 324 that provides a 90° phase shift for the output of local oscillator 320. Accordingly, mixer 308B is able to extract the Q modulated channel of the received signal from receiver/LNA 304, while mixer 308A is able to extract the I modulated channel. Receiving an accurate reference signal having the desired reference frequency, therefore, is important for accurately down converting the received RF signal. Thus, the inventive charge pump facilitates accurate voltage level signal generation to the loop filter and to the voltage-controlled oscillator and therefore facilitates the generation of an accurate reference frequency.

The I and Q modulated channels produced by mixers 308A and 308B are then fed into low pass filters 312A and 312B, respectively. After the I and Q modulated channels are produced to low pass filters 312A and 312B, respectively, the filtered output of the low pass filters 312A and 312B are produced to amplification circuitry, for example, programmable gain amplifiers 316A and 316B of FIG. 3A. The outputs of the programmable gain amplifiers 316A and 316B are then produced from the integrated circuit radio circuitry to analog-to-digital converters (ADCs). In the described embodiment, the ADCs for extracting and processing the information within the I and Q modulated channels are within the baseband processing circuitry external to the IF radio integrated circuit. While the described embodiment of the receiver, including the inventive charge pump, is separate from the baseband processor, alternate embodiments include the radio circuitry with the inventive charge pump being formed on the same device as the baseband processor circuitry.

While in theory such an approach works well, there are several problems with such a system that have been recognized by the present inventor. First, when a switch is either closed or opened to add or remove a current sink or source from the output of the charge pump, transient conditions become present until a steady state is reached. For example, when a switch is opened to remove current source, there is still charge present in the channel of the MOSFETs coupled to the output node of the charge pump. This built up charge tends to discharge into or out of the output node according to the type of MOSFET (n-channel or p-channel) thereby decreasing or increasing the current to/from the loop filter thereby increasing or decreasing the output voltage from the loop filter that is fed to the voltage-controlled oscillator. More specifically, when the UP or DOWN switches are turned off there is a charge present in the channel. This built up charge must go someplace so it discharges in to (or out of) the output node thereby increasing (or decreasing) the current to the loop filter further increasing the mismatch between IUP and IDOWN. This charge, therefore, may inadvertently affect the output frequency of the phase-locked loop, albeit for a temporary period.

An additional problem that has been recognized by the present inventor is that there exists a mismatch between the current transfer function symmetry according to whether current is being sourced or sinked. This mismatch between a source current IUP and a sink current IDOWN can result in a net current being produced by the charge pump to be higher or lower than desired for a specified circuit condition.

As the VCO frequency converges to the desired frequency, the phase difference between the VCO signal and the reference frequency decreases until the UP or DOWN signal is only on for a very short time. As a result, the UP or DOWN signal will turn off before reaching the amplitude level required to control the current switches. Consequently, the phase-locked loop VCO reaches a dead zone where the charge pump is no longer controlling the VCO frequency. This can cause the VCO frequency to drift while in the dead zone thereby causing fluctuation in the IF frequency.

Referring now to FIG. 3B, a radio transmitter formed to communicate in a complementary manner to the receiver of FIG. 3A is coupled to received a digital output from a baseband processor that is formed off chip. It is understood, of course, that the baseband processor may readily be formed on chip and any embodiments of the invention specifically include off chip as well as on chip configurations. The digital output is specifically received by a pair of digital-to-analog components that produce analog I and Q output components that are to be transmitted. Thereafter, the analog I and Q output components are filtered and amplified by a pair of filtering and amplification modules 326A and 326B. Thereafter, the filtered and amplified outputs of the filtering and amplification modules 326A and 326B are mixed by mixers 328A and 328B with a local oscillation to produce I and Q RF components that are then combined, modulated and amplified by a power amplifier 332 and are filtered by a channel select filtration module 336. The operation of each of these components including the channel select filtration module 336 and power amplifier 332 are known to those of average skill in the art. It is understood that, according to design, that the signals may be converted from baseband to an intermediate frequency or to RF directly. In general, the input signal may be any low IF signal as defined herein.

Referring now to FIG. 3C, a functional block diagram of a phase-locked loop circuit is shown. A reference signal, Φ REF, is provided into a first input 350 of a phase frequency detector (PFD) 354. A second input 358 of the PFD 354 receives a feedback signal, Φ VCO, from the output of a divide by N/fractional N module 362. The divide by N/fractional N module 362 is coupled to receive the VCO output and provides a divided output to the PFD 354. The divisor N is selected so that the divided VCO output frequency will be approximately equal to the reference frequency Φ REF. The PFD 354 determines a phase difference, ΔΦ, between the two inputs and generates an UP signal 364 or a DOWN signal 366 dependent on the Φ VCO signal leading or lagging the Φ REF signal. When Φ VCO lags Φ REF, the UP signal 364 is transmitted to a charge pump 370 to prompt it to generate an IUP current to a loop filter 374. The IUP current source injects current into the loop filter 374 causing internal capacitors of the loop filter to charge thereby increasing the VCO control voltage (VCTRL) 378 and, correspondingly, increasing the VCO frequency and decreasing phase difference ΔΦ. Similarly, when Φ VCO leads Φ REF, the DOWN signal 366 is transmitted to the charge pump to prompt it to sink current from the loop filter thereby lowering the VCO control voltage to VCO 382. The IDOWN current sink draws current from the loop filter 374 causing the loop filter capacitors to discharge which decreases VCTRL 378 thereby decreasing the VCO frequency and decreasing phase difference ΔΦ. As is known by one of average skill in the art, the loop filter serves to convert a DC current produced by the charge pump circuitry into a voltage that drives the VCO 382 to produce a corresponding frequency of oscillation.

Figure 4A:
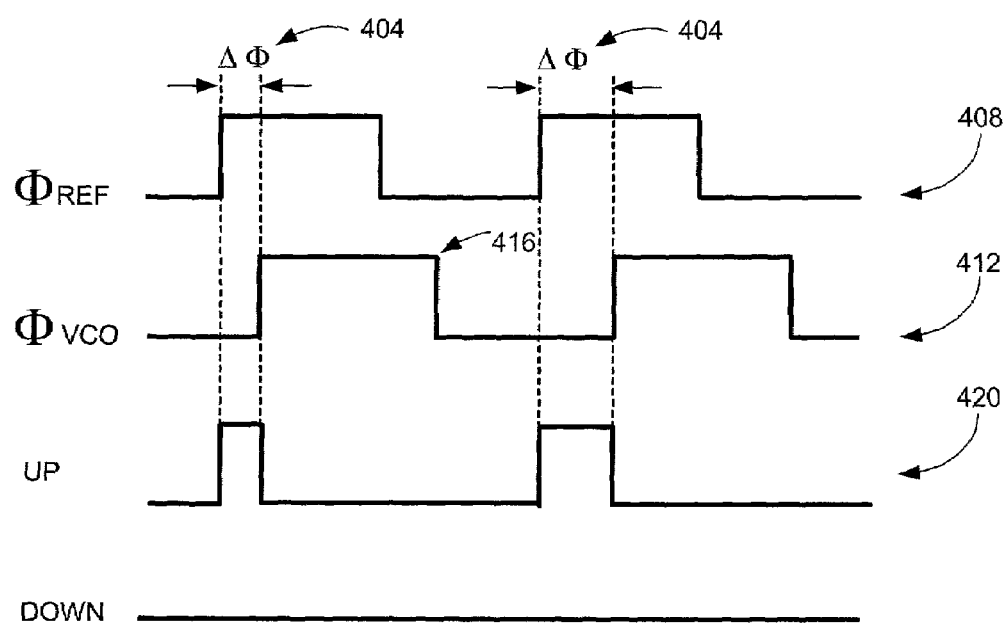
FIGS. 4A and 4B illustrate the signal waveforms generated in a phase-locked loop when the phase difference is relatively large.
Figure 4B:
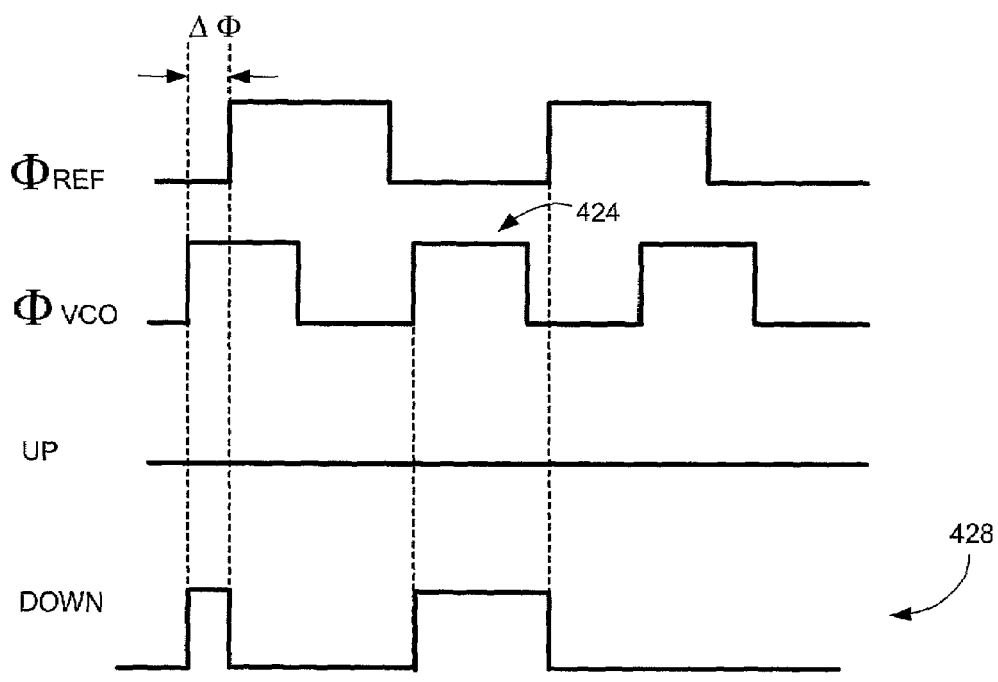

FIGS. 4A and 4B illustrate the signal waveforms generated in a phase-locked loop when the phase difference ΔΦ shown at 404 is relatively large. The phase frequency detector receives a reference frequency 408, Φ REF, and a VCO frequency 412, Φ VCO. As shown generally at 416, the VCO frequency, Φ VCO, is lower than the reference frequency 408, Φ REF, so ΔΦ lags the reference frequency. The phase frequency detector generates an UP signal 420, which will prompt the charge pump to source current into the loop filter thereby increasing the VCO input voltage and corresponding frequency as previously discussed. During this mode of operation, the phase frequency detector does not produce a DOWN signal. Conversely, when the VCO frequency is higher than the reference frequency, as shown generally at 424 in FIG. 4B, ΔΦ leads the reference frequency. The phase frequency detector generates a DOWN signal 428 that will prompt the charge pump to sink current from the loop filter thereby decreasing the VCO input voltage level and corresponding frequency.

Figure 5A:
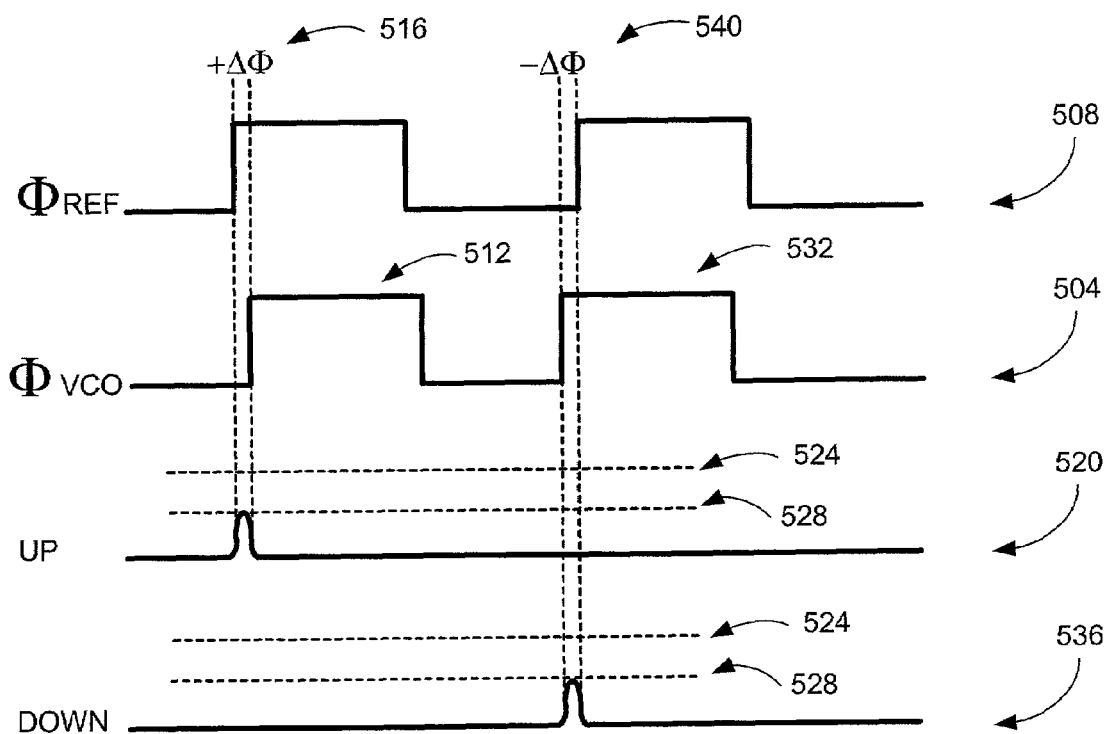
FIG. 5A illustrates the signal waveforms generated in a phase-locked loop when the frequency difference is very small.

FIG. 5A illustrates the signal waveforms generated in a phase-locked loop when the frequency difference ΔΦ, shown generally at 516 and 540, is very small. In this example, the ΦVCO frequency, shown generally at 504, is at first lower than the reference frequency, shown generally at 508, and then higher than the reference frequency. When the VCO frequency is lower than the reference signal, as shown at 512, the ΦVCO signal lags the reference frequency ΦREF by a small interval shown generally at 516. Because the ΔΦ is so small, an UP signal 520 does not reach full amplitude, shown generally at 524, before being cutoff by the leading edge of the ΦVCO signal. This effectively attenuates the UP signal amplitude to a level 528 that is too low to turn on the UP current switch. Consequently, the charge pump will not source current into the loop filter and the control voltage will not change. In a similar manner, when the VCO frequency is higher than the reference frequency, shown generally at 532, the phase frequency detector generates a DOWN signal 536 that is attenuated due to the small phase difference shown at 540. Similarly, the attenuated DOWN signal will not turn on the DOWN current switch and the charge pump will not sink the current required to lower the control voltage and corresponding output frequency from the VCO. As can be seen from the previous discussion, there is a dead zone where the VCO frequency is not responsive to the phase detector output.

Figure 5B:
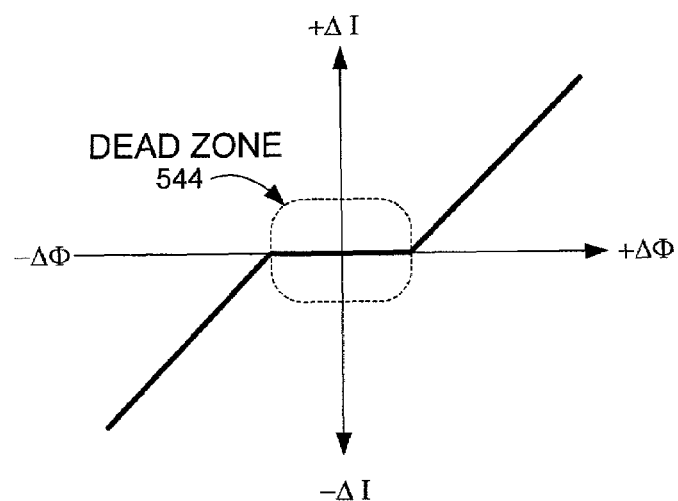
FIG. 5B illustrates the dead zone created when the phase frequency detector is unable to control the IUP and IDOWN currents due to the attenuated UP and DOWN signal.

FIG. 5B illustrates a dead zone 544 created when the phase frequency detector is unable to control the IUP and IDOWN currents due to the attenuated UP and DOWN signals as illustrated in FIG. 5A. Over the range of −ΔΦ to +ΔΦ, there is dead zone 544 where the IUP and IDOWN currents are not active. Accordingly, ΦVCO does not change because there is no change in VCTRL.

Figure 6:
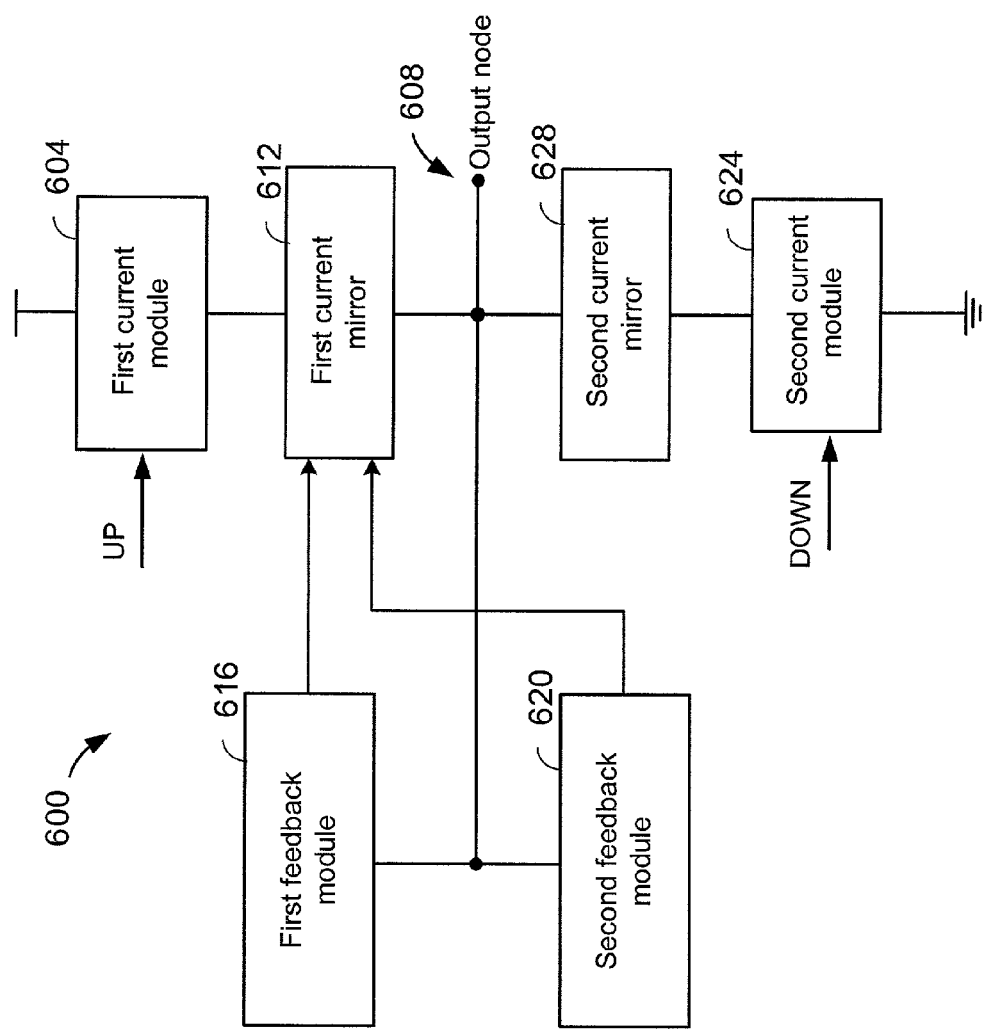
FIG. 6 is a functional block diagram illustrating one embodiment of the present invention.

FIG. 6 is a functional block diagram illustrating one embodiment of the present invention. Referring now to FIG. 6, a charge pump 600 includes a first current module 604 that is coupled to receive an UP control signal from a phase frequency detector (not shown). The control signal is for prompting the first current module 604 to generate a current that is to be sourced into an output node 608 whenever the UP control signal is received. A first current mirror 612 is for regulating the amount of current that is sourced into output node 608 by first current module 604 and is coupled to receive a current from first current module 604 and to output a regulated current into output node 608.

First current mirror 612 further is coupled to receive control signals from a first feedback module 616 and from a second feedback module 620. First and second feedback modules 616 and 620, respectively, are coupled to receive, in a feedback path, an output voltage level from output node 608. First feedback module 616 is formed to generate control signals to first current mirror 612 to decrease current flow into output node 608 whenever the output voltage sensed from output node 608 decreases. Second feedback module 620 is formed to generate control signals to first current mirror 612 to increase current flow into output node 608 whenever the output voltage sensed from output node 608 increases. A second current module 624 is formed to sink current from output node 608 whenever a DOWN control signal is received from a phase frequency detector. The amount of current that is sinked, however, is regulated by a second current mirror 628.

Figure 7:
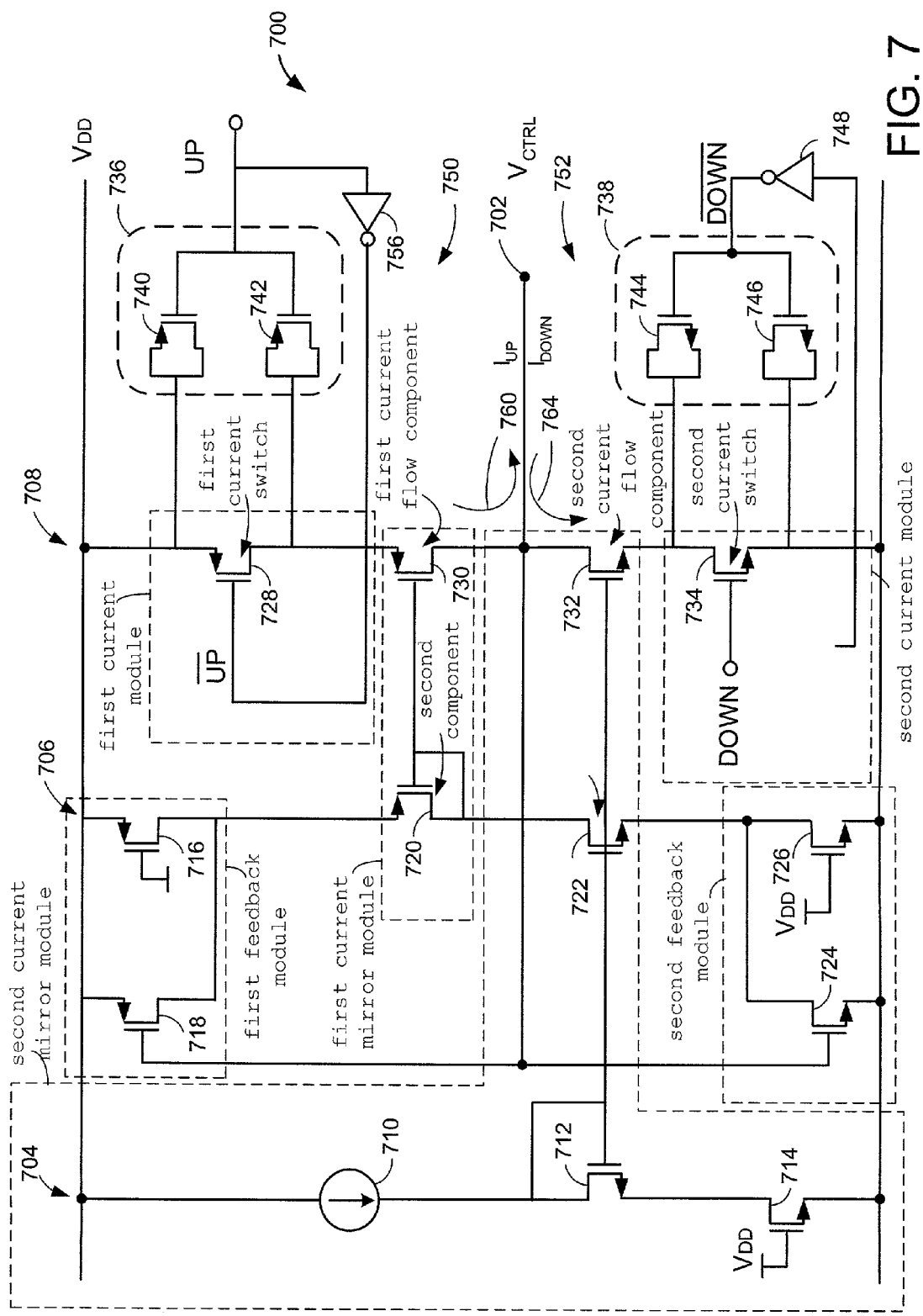
FIG. 7 is a schematic diagram of one embodiment of the invention.

FIG. 7 is a schematic diagram of one embodiment of the invention. A charge pump shown generally at 700 includes a plurality of matched MOSFET transistors and is formed to provide dynamic current control of the charge current based on the VCO control voltage, VCTRL that is produced from an output node 702 of charge pump 700. As may be seen, charge pump 700 includes three branches 704, 706, and 708 that conduct current from VDD to circuit common or ground. Branch 704 includes a current source 710 that is coupled in series with an n-channel enhancement MOSFET 712 that is configured as a part of a current mirror as will be explained in greater detail below. MOSFET 712 is also coupled in series with an n-channel MOSFET 714 biased to act as a resistor.

Branch 706 includes a p-channel MOSFET 716 that is biased to act as a resistor and that is coupled to VDD. A second p-channel MOSFET 718 is coupled in parallel to MOSFET 716 and is for decreasing an output current from the charge pump by a small amount to flatten an output current curve at an output VCTRL. Stated differently, MOSFET 718 reduces an output current responsive to small drops in VCTRL. As may be seen, a gate terminal of MOSFET 718 is coupled to VCTRL in a feedback path that turns MOSFET 718 on harder (increases the gate-to-source voltage) as VCTRL drops and, alternatively, turns off some (decreases the gate-to-source voltage) as VCTRL increases.

The parallel combination of MOSFETs 716 and 718 is coupled in series with a p-channel MOSFET 720 that is coupled as a part of a current mirror. Generally, the current conducted through MOSFET 720, by the nature of current mirror operation, is reflected in an upper portion of branch 708 and therefore defines an IUP current 760 shown in FIG. 7 as IUP. MOSFET 720 is also coupled in series with an n-channel MOSFET 722 that, in turn, is coupled with a parallel combination of n-channel MOSFETs 724 and 726. A gate terminal of MOSFET 724 is coupled to the gate terminal of MOSFET 718 and to the output VCTRL of charge pump 700. MOSFET 726 is biased to act as a resistor. The combination of MOSFETs 724 and 726, as well as MOSFET 722, at least partially define a current level that flows through MOSFET 720. As VCTRL drops, a source-to-gate voltage of MOSFET 718 increases and reduces its effective drain-to-source resistance. The decreasing parallel resistance combination of MOSFET 718 and MOSFET 716 increases the source voltage of MOSFET 720. MOSFET 720 gate voltage increases with the increasing source voltage to maintain MOSFET 720 drain current to the level set by MOSFET 722. Because a p-channel MOSFET 730 gate terminal is coupled to the gate terminal of MOSFET 720, an increase in the gate voltage of MOSFET 720 voltage increases the gate voltage of MOSFET 730 and therefore decreases the gate-to-source voltage of MOSFET 730 thereby decreasing its drain current and reducing the IUP current 760.

The third current branch 708 includes a p-channel MOSFET 728 that is coupled in series with MOSFET 730. A gate terminal of MOSFET 730 is coupled to a gate terminal and drain terminal of MOSFET 720 in a current mirror configuration generally to follow the current conducted through MOSFET 720. A drain terminal of MOSFET 730 is coupled to the output VCTRL of charge pump 700, to the gate terminals of MOSFETs 718 and 724, and to a drain terminal of an n-channel MOSFET 732. MOSFET 732 further is coupled in series with an n-channel MOSFET 734.

MOSFETs 728 and 734 are coupled to receive the UP and DOWN signals, respectively, generated by a phase frequency detector (e.g., phase frequency detector 354 of FIG. 3C) and generally operate as current switches. More precisely, however, MOSFET 728 receives the inverted UP signal from the phase frequency detector by way of an inverter 756. Alternatively, the inverted UP and DOWN signals may be provided directly from the phase frequency detector. In general, the currents IUP and IDOWN are only generated in portions of branch 708 as long as UP and DOWN are set to a logic "1", respectively.

Continuing to examine FIG. 7, the source and drain terminals of MOSFETs 728 and 734 are further coupled to a pair of discharge circuits 736 and 738, respectively. Discharge circuit 736 includes a pair of p-channel MOSFETs 740 and 742 whose source and drain terminals are coupled to enable the MOSFET to receive a charge and therefore to discharge any built up charge in MOSFET 728 whenever UP transitions to a logic "0". Similarly, discharge circuit 738 includes a pair of n-channel MOSFETs 744 and 746 whose source and drain terminals are coupled to enable the MOSFET to receive a charge and therefore to discharge any built up charge in the channel of MOSFET 734 whenever DOWN transitions to a logic "0". As may be seen, the gate terminals of MOSFETs 740 and 742 are coupled to receive the UP signal while the gate terminals of MOSFETs 744 and 746 are coupled to receive the inverted DOWN signal from an inverter 748 that is coupled to receive the DOWN signal. Generally, discharge circuit 736 is coupled and formed to receive a built up charge of MOSFET 728 to prevent the built up charge from generating a momentary current that will disturb VCTRL. Similarly, discharge circuit 738 is coupled and formed to receive a built up charge of MOSFET 734 to prevent the built up charge from generating a momentary current in lower circuit portion 752.

In an operational state in which VCTRL is equal to or nearly equal to a desired value and the phase difference $\Delta\Phi$ is very small, as described in relation to FIG. 4, the phase frequency detector supplies a control pulse UP and DOWN to turn on both MOSFETS 728 and 734, respectively. Under ideal conditions, IUP current 760 and an IDOWN current 764 are equal and no current flows from output node 702. In this situation, current flowing through MOSFET 728 flows through MOSFET 734. Due to channel length modulation and other process variables, however, as well as operational differences between PMOS and NMOS devices, IUP and IDOWN are not always equal or matched thereby causing VCTRL to drift from a desired value.

As VCTRL increases due to the effects of channel length modulation, for example, the current conducted through MOSFET 730 tends to, in the described embodiment, decrease due to a decrease in the drain-to-source voltage of p-channel (enhancement mode) MOSFET 736. More specifically, as VCTRL increases, a gate-to-source voltage forward bias increases for MOSFET 724 (an n-channel device). MOSFET 724 goes into a linear region where it becomes a small resistance. MOSFET 726 (also an n-channel device) operates in the linear region by virtue of having its gate tied to VDD. MOSFETs 724 and 726 are matched and scaled so they have a nearly equal resistance when biased in the linear region. Further, MOSFETs 724 and 726 are coupled in parallel so the parallel resistance is ½ the resistance of 724 (or 726) assuming the MOSFETs are matched and scaled. The scaling and/or matching may, however, be varied.

The reduced parallel resistance connected to the source terminal of MOSFET 722 results in a reduced voltage at the source terminal of MOSFET 722 thereby increasing the gate-to-source voltage of MOSFET 722 and the current conducted there through. Specifically, the MOSFET 722 gate-to-source voltage increases, due to the drop in source voltage, which therefore increases the drain current of MOSFET 722. MOSFETs 720 and 730 are configured as a current mirror so the increase in MOSFET 722 current is mirrored in MOSFET 730 therefore increasing MOSFET 730 drain current and therefore increasing the value of IUP in upper circuit portion 750 that is conducted by MOSFET 730.

The IDOWN current conducted by MOSFET 732 is limited, however, by the amount of current generated by current source 710 and conducted through current mirror MOSFET 712. Accordingly, the increased drain current of MOSFET 730 will not be conducted by MOSFET 732 and, therefore, adds to the IUP current 760.

As VCTRL moves towards zero, MOSFETs 718 and 716 work in a manner similar to 724 and 726 except that they act to lower the IUP current responsive to decreases in VCTRL. As described before, the decrease in VCTRL turns on MOSFET 718 a little more. Because current in branch 706 is limited and held constant by MOSFET 722, however, the voltage at the drain and source of MOSFET 720 increases. Because the gate of MOSFET 720 is coupled to the drain, however, the source-to-gate voltage of MOSFET 730 is decreased thereby reducing (slightly) current flow through MOSFET 730. Accordingly, IUP is decreased. As VCTRL moves towards zero, therefore, IUP is dynamically adjusted downwards to minimize the difference between IUP and IDOWN. Similarly, as VCTRL moves towards VDD, IUP is dynamically adjusted upwards to minimize the difference between IUP and IDOWN.

Charge injection is cancelled by including a pair of discharge circuits 736 and 738 in parallel with MOSFETs 728 and 734. When either MOSFETs 728 or 734 receive an "on" signal at its gate terminal, charge will build up in the channel as current conducts through the MOSFET. This charge current will disturb the IUP and IDOWN current further increasing the current mismatch. The discharge circuits provide a discharge path for the built up charge thereby avoiding the introduction of undesirable current due to the built up charge. When the current switch is turned "off", the discharge circuits receive a corresponding "on" command due to the inverted signal coupled to the gate terminal. When turned on, MOSFETs 740, 742, 744 and 746 act like small capacitors to drain off any excess charge in MOSFETs 728 and 734.

Figure 8:
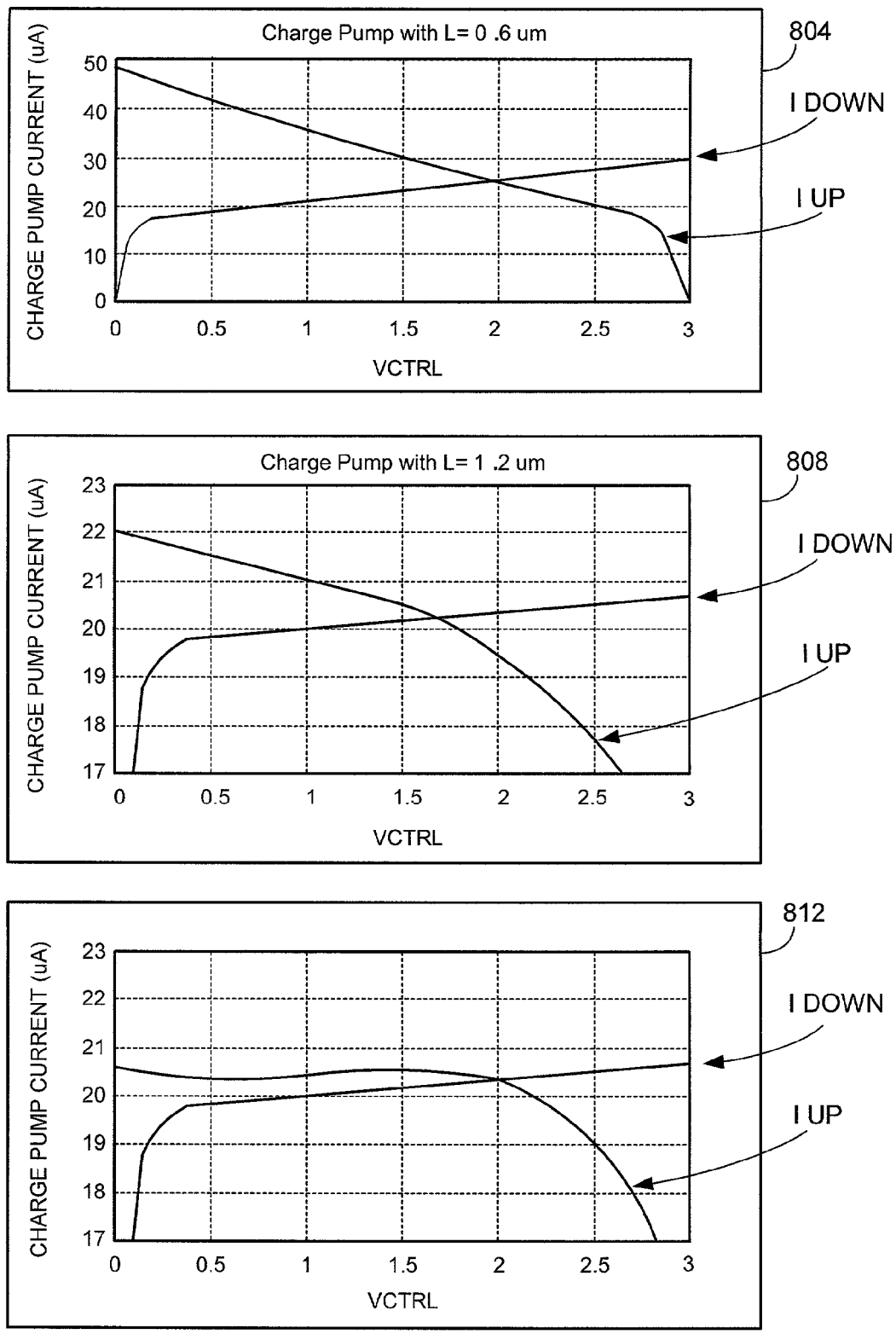
FIG. 8 is a set of graphs that contrast operation of a charge pump formed according to one embodiment of the present invention.

FIG. 8 is a set of graphs that contrast operation of a charge pump formed according to one embodiment of the present invention. Referring now to FIG. 8, a graph 804 illustrates the operation of a charge pump without the dynamic current symmetry control of the present invention. As may be seen, for a MOSFET having a 0.6 micrometer channel length, the current IUP is approximately 15 micro-amps greater than the current IDOWN for a VCTRL of 1 volt. The traditional method to reduce current mismatch is to increase the MOSFET channel length. By doubling the channel length to 1.2 micrometers, as is shown in chart 808, the current IUP is approximately 1 microamp greater than the current IDOWN for a VCTRL of 1 volt. Using the inventive circuit with a MOSFET having a 0.6 micrometer channel length, as is shown in chart 812, the current IUP is approximately 0.5 microamps greater than the current IDOWN for a VCTRL of 1 volt. Thus, as may be seen, increasing the channel length by doubling it reduces the mismatch illustrated in chart 804 to a level that is within an order of magnitude of the reduction produced by the inventive charge pump with the dynamic current symmetry control. To maintain scaled performance between MOSFETs, however, the channel width must also be doubled if the channel length is doubled. This results in an increase in parasitic capacitance values and requires four times greater IC real estate for each MOSFET having an increased channel length and width. Accordingly, a design approach according to the present invention reduces mismatch while minimizing the amount of IC real estate and additional parasitic capacitance added to a circuit.

Figure 9:
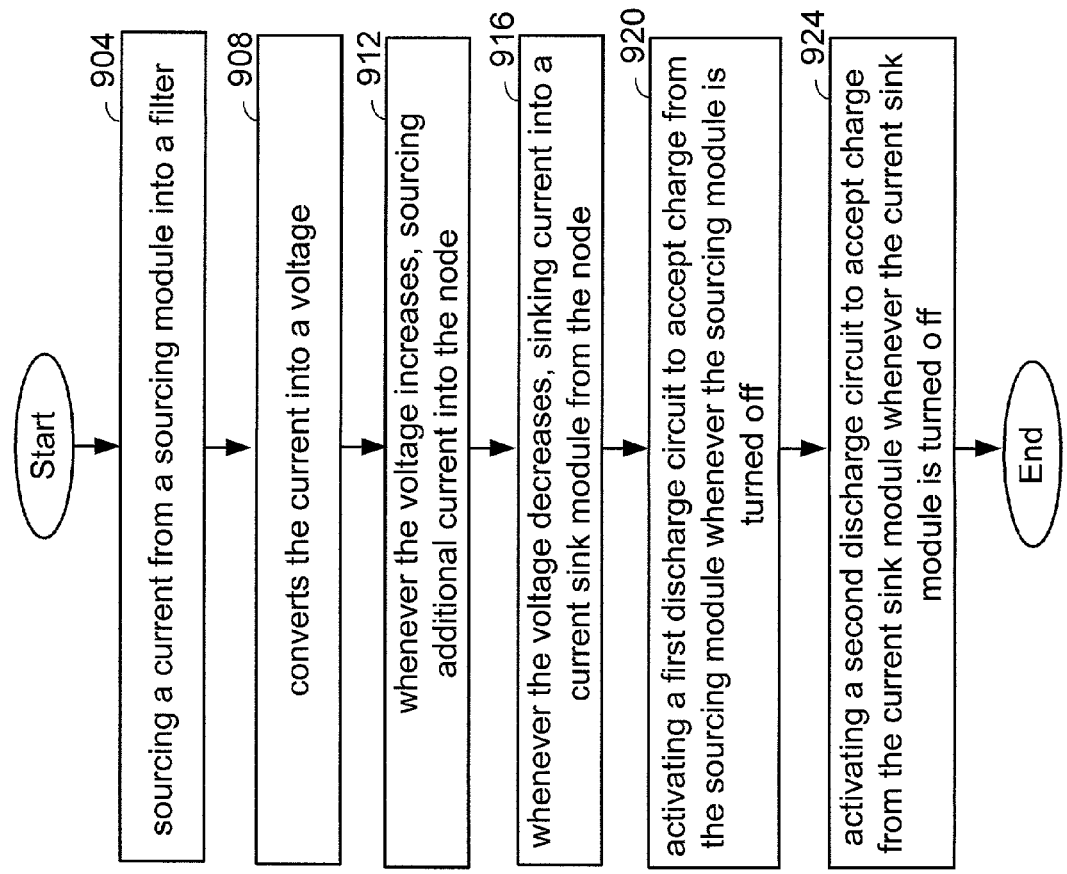
FIG. 9 is a flow chart illustrating one method according to the present invention.

FIG. 9 is a flow chart illustrating one method according to the present invention. More specifically, a method for adjusting voltage produced to a voltage-controlled oscillator in a transceiver includes sourcing a current from a sourcing module into a filter (step 904) wherein the filter converts the current into a voltage. The filter and the voltage-controlled oscillator are both coupled to a node (the output node of the charge pump of the local oscillation circuitry/module), which output node is the one into which the current is sourced to charge at least one capacitor of the loop filter to convert the current into a voltage (step 908) to initially set the voltage-controlled oscillator. Thereafter, whenever the voltage increases, additional current is sourced into the node (step 912) and whenever the voltage decreases, current is sinked into a current sink module from the node (step 916).

The invention contemplates the use of feedback circuitry/modules to control the current sinking and sourcing to adjust the voltage produced by a loop filter to an input of the voltage-controlled oscillator. Additionally, however, the invention further includes activating a first discharge circuit to accept charge from the sourcing module whenever the sourcing module is turned off (step 920) and, similarly, activating a second discharge circuit to accept charge from the current sink module whenever the current sink module is turned off (step 924).

The invention disclosed herein is susceptible to various modifications and alternative forms. Specific embodiments therefore have been shown by way of example in the drawings and detailed description. It should be understood that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A charge pump of a local oscillator of a radio transceiver, the charge pump for sinking current from and sourcing current to an output node, the charge pump comprising:
    a first current module for generating a source current for transmission into the output node;
    a second current module for sinking a current from the output node;
    a first current mirror module for adjusting current flow generated by the first current module, the first current mirror module including a first current flow component coupled in series between the first current module and the output node;
    a second current mirror module for defining a fixed amount of current that is sinked from the output node, the second current mirror module including a second current flow component coupled in series between the output node and the second current module;
    a first feedback module coupled to a second component of the first current mirror module, the first feedback module also coupled to the output node, the first feedback module for prompting the first current flow component of the first current mirror module to decrease the magnitude of the source current produced by the first current module responsive to a decrease in an output voltage; and
    a second feedback module coupled to the output node and to the first feedback module and coupled in series with a branch component of the second current mirror module that, in turn, is coupled in series with the second component of the first current mirror module, the second feedback module for prompting the second component and the first current flow component, both of the first current mirror, to increase the magnitude of the source current produced by the first current module responsive to an increase in the output voltage.

2. The charge pump of claim 1 wherein the first current module comprises a first current switch coupled to receive a first control signal from a phase frequency detector wherein the first current switch completes a connection between a supply and the first current flow component of the first current mirror.

3. The charge pump of claim 2 wherein the second current module comprises a second current switch coupled to receive a second control signal from the phase frequency detector wherein the second current switch completes a connection between a circuit common and the second current flow component of the second current mirror.

4. The charge pump of claim 1 wherein the second component of the first current mirror comprises a MOSFET having a gate, a drain and a source terminal, and wherein the first feedback module is coupled to the source terminal of the MOSFET and wherein the drain terminal is coupled to the branch component of the second current mirror.

5. The charge pump of claim 4 wherein the branch component of the second current mirror module and the first current flow component of the first current mirror each comprises a MOSFET having a gate, a source and a drain terminal, and wherein the gate and drain terminals of the second component and the gate terminal of the first flow component of the first current mirror are all coupled to the branch component of the second current mirror.

6. The charge pump of claim 1 wherein the first feedback circuit module includes a p-channel MOSFET having a gate terminal coupled to the output node wherein an increase in the output voltage reduces a source-to-gate voltage of the p-channel MOSFET and wherein a decrease in the output voltage increases the source-to-gate voltage of the p-channel MOSFET.

7. The charge pump of claim 6 wherein a decrease in the output voltage increases the gate-to-source voltage of the p-channel MOSFET and further increases a gate voltage of the MOSFET of the first current mirror.

8. The charge pump of claim 7 wherein an increase in the gate voltage of the first current mirror reduces current flow through the first current flow component of the first current mirror that is coupled in series with the first current module.

9. The charge pump of claim 1 wherein the second feedback module includes an n-channel MOSFET having a gate coupled to the output node wherein an increase in the output voltage increases a gate-to-source voltage of the n-channel MOSFET and increases current flow through the n-channel MOSFET.

10. The charge pump of claim 9 wherein the increased current flow through the n-channel MOSFET increases current flow through the branch component of the second current mirror module coupled in series with the n-channel MOSFET.

11. The charge pump of claim 10 wherein the increase in current flow through the n-channel MOSFET and through the branch component of the second current mirror module results in an increase in current flow through the second component of the first current mirror module thereby increasing the current sourced by the first current module into the output node.

12. A radio transmitter, comprising:
a digital baseband processing module for producing in-phase (I) and quadrature (Q) components from outbound data;
filter circuitty for producing filtered I and Q components from the I and Q components;
up-conversion circuitry operably coupled to convert the filtered I and Q components into a radio frequency (RF) signal, the up-conversion circuitry coupled to receive a local oscillation;
a local oscillation module for producing the local oscillation, the local oscillation module comprising:
a charge pump for sinking current from and sourcing current to an output node, the charge pump further comprising:
a first current module for generating a source current into the output node;
a second current module for sinking a current from the output node;
a first current mirror for adjusting current flow generated by the first current module, the first current mirror including a first current flow component coupled in series between the first current module and the output node;
a second current mirror module for defining a fixed amount of current that is sinked from the output node, the second current mirror module including a second current flow component coupled in series between the output node and the second current module;
a first feedback module coupled to the first current mirror, the first feedback module for prompting the first current flow component of the first current mirror to decrease the magnitude of the source current produced by the first current module; and
a second feedback module coupled in series with a branch component of the second current mirror that is coupled in series with a second component of the first current mirror, the second feedback module for prompting the second component and the first current flow component, both of the first current mirror, to increase the magnitude of the source current produced by the first current module; and
a power amplifier that is coupled to receive and is for amplifying the RF signal prior to transmission via an antenna.

13. The radio transmitter of claim 12 wherein the first current module comprises a first current switch coupled to receive a first control signal from a phase frequency detector wherein the first current switch completes a connection between a supply and the first current flow component of the first current mirror.

14. The radio transmitter of claim 13 wherein the second current module comprises a second current switch coupled to receive a second control signal from the phase frequency detector wherein the second current switch completes a connection between a circuit common and the second current flow component of the second current mirror.

15. The radio transmitter of claim 12 wherein the second component of the first current mirror comprises a MOSFET having a gate, a drain and a source terminal, and wherein the first feedback module is coupled to the source terminal of the MOSFET and wherein the drain terminal is coupled to the branch component of the second current mirror.

16. The radio transmitter of claim 15 wherein the branch component of the second current mirror module and the first current flow component of the first current mirror each comprises a MOSFET having a gate, a source and a drain terminal, and wherein the gate and drain terminals of the second component and the gate terminal of the first flow component of the first current mirror are all coupled to the branch component of the second current mirror.

17. The radio transmitter of claim 12 wherein the first feedback circuit module includes a p-channel MOSFET having a gate terminal coupled to the output node wherein an increase in the output voltage reduces a source-to-gate voltage of the p-channel MOSFET and wherein a decrease in the output voltage increases the source-to-gate voltage of the p-channel MOSFET.

18. The radio transmitter of claim 17 wherein a decrease in the output voltage increases the gate-to-source voltage of the p-channel MOSFET and further increases a gate voltage of the MOSFET of the first current mirror.

19. The radio transmitter of claim 18 wherein an increase in the gate voltage of the first current mirror reduces current flow through the first current flow component of the first current mirror that is coupled in series with the first current module.

20. The radio transmitter of claim 12 wherein the second feedback module includes an n-channel MOSFET having a gate coupled to the output node wherein an increase in the output voltage increases a gate-to-source voltage of the n-channel MOSFET and increases current flow through the n-channel MOSFET.

21. The radio transmitter of claim 20 wherein the increased current flow through the n-channel MOSFET increases current flow through the branch component of the second current mirror module coupled in series with the n-channel MOSFET.

22. The radio transmitter of claim 21 wherein the increase in current flow through the n-channel MOSFET and through the branch of the second current mirror module results in an increase in current flow through the second component of the first current mirror module thereby increasing the current sourced by the first current module into the output node.

23. A radio receiver, comprising:
a low noise amplifier (LNA) coupled to amplify a radio frequency (RE) signal to produce an amplified RE signal;
down conversion module operably coupled to convert the RE signal into a low intermediate frequency (IF) signal, wherein the down conversion module is coupled to receive a local oscillation;
a local oscillation module for producing the local oscillation, the local oscillation module comprising:
  a charge pump, the charge pump for sinking current from and sourcing current to an output node, the charge pump further comprising:
    a first current module for generating a source current into the output node;
    a second current module for sinking a current from the output node;
    a first current mirror for adjusting current flow generated by the first current module, the first current mirror including a first current flow component coupled in series between the first current module and the output node;
    a second current mirror for defining a fixed amount of current that is sinked from the output node, the second current mirror including a second current flow component coupled in series between the output node and the second current module;
    a first feedback module coupled to the first current mirror, the first feedback module for prompting the first current flow component of the first current mirror to decrease the magnitude of the source current produced by the first current module; and
    a second feedback module coupled in series with a branch component of the second current mirror that is coupled in series with a second component of the first current mirror, the second feedback module for prompting the second component and the first current flow component, both of the first current mirror, to increase the magnitude of the source current produced by the first current module;
filtering/gain module operably coupled to filter and amplify the I and Q components of the low IF signal to produce a filtered low IF signal; and
digital receiver processing module coupled to convert the filtered low IF signal into inbound data.

24. The radio receiver of claim 23 wherein the first current module comprises a first current switch coupled to receive a first control signal from a phase frequency detector wherein the first current switch completes a connection between a supply and the first current flow component of the first current mirror.

25. The radio receiver of claim 24 wherein the second current module comprises a second current switch coupled to receive a second control signal from the phase frequency detector wherein the second current switch completes a connection between a circuit common and the second current flow component of the second current mirror.

26. The radio receiver of claim 23 wherein the second component of the first current mirror comprises a MOSFET having a gate, a drain and a source terminal, and wherein the first feedback module is coupled to the source terminal of the MOSFET and wherein the drain terminal is coupled to the branch component of the second current mirror.

27. The radio receiver of claim 26 wherein the branch component of the second current mirror module and the first current flow component of the first current mirror each comprises a MOSFET having a gate, a source and a drain terminal, and wherein the gate and drain terminals of the second component and the gate terminal of the first flow component of the first current mirror are all coupled to the branch component of the second current mirror.

28. The radio receiver of claim 23 wherein the first feedback circuit module includes a p-channel MOSFET having a gate terminal coupled to the output node wherein an increase in the output voltage reduces a source-to-gate voltage of the p-channel MOSFET and wherein a decrease in the output voltage increases the source-to-gate voltage of the p-channel MOSFET.

29. The radio receiver of claim 28 wherein a decrease in the output voltage increases the gate-to-source voltage of the p-channel MOSFET and further increases a gate voltage of the MOSFETs of the first current mirror.

30. The radio receiver of claim 29 wherein an increase in the gate voltage of the first current mirror reduces current flow through the first current flow component of the first current mirror that is coupled in series with the first current module.

31. The radio receiver of claim 23 wherein the second feedback module includes an n-channel MOSFET having a gate coupled to the output node wherein an increase in the output voltage increases a gate-to-source voltage of the n-channel MOSFET and increases current flow through the n-channel MOSFET.

32. The radio receiver of claim 31 wherein the increased current flow through the n-channel MOSFET increases current flow through the branch component of the second current mirror module coupled in series with the n-channel MOSFET.

33. The radio receiver of claim 32 wherein the increase in current flow through the n-channel MOSFET and through the branch component of the second current mirror module results in an increase in current flow through the second component of the first current mirror module thereby increasing the current sourced by the first current module into the output node.

* * * * *